Patented Nov. 21, 1933

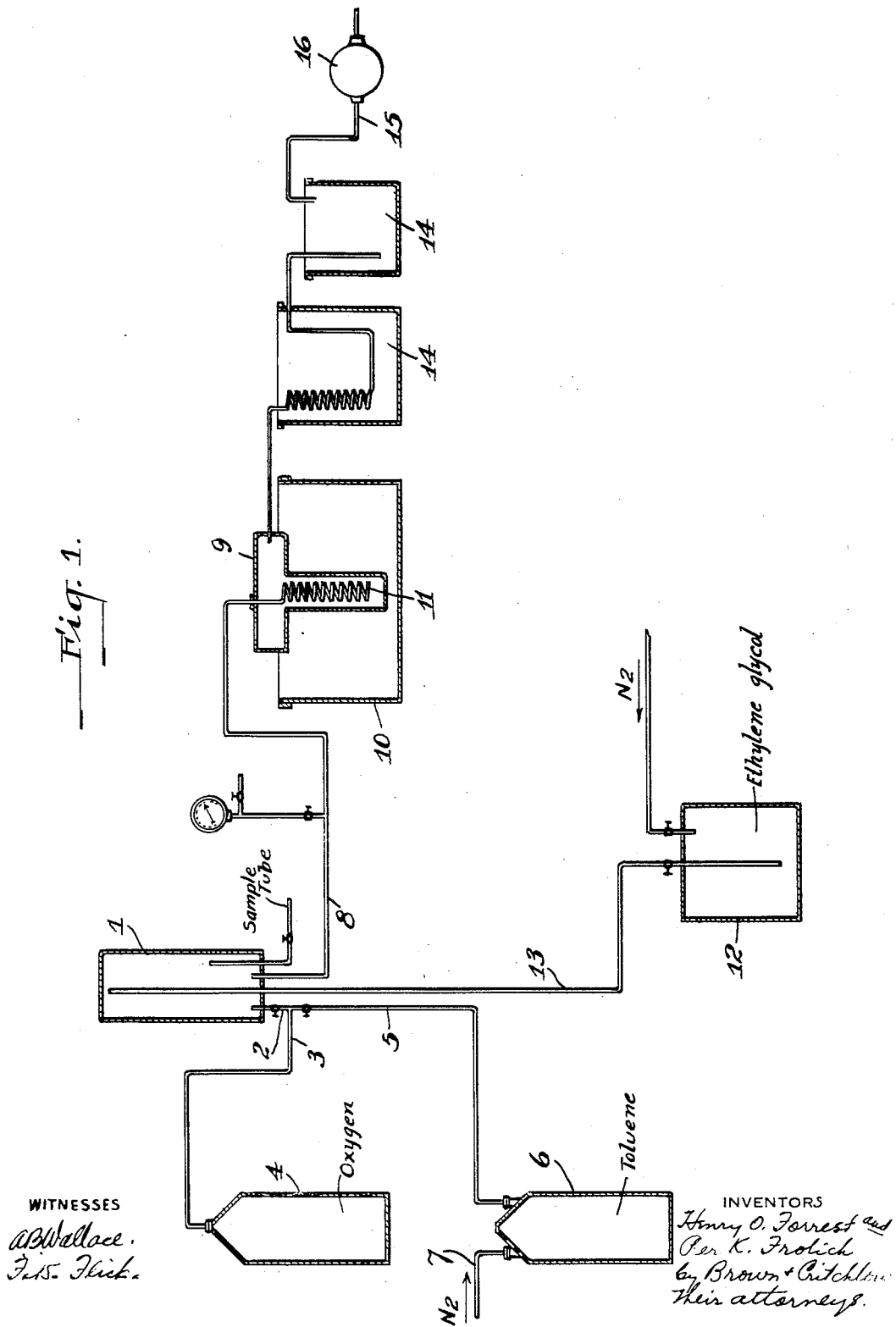

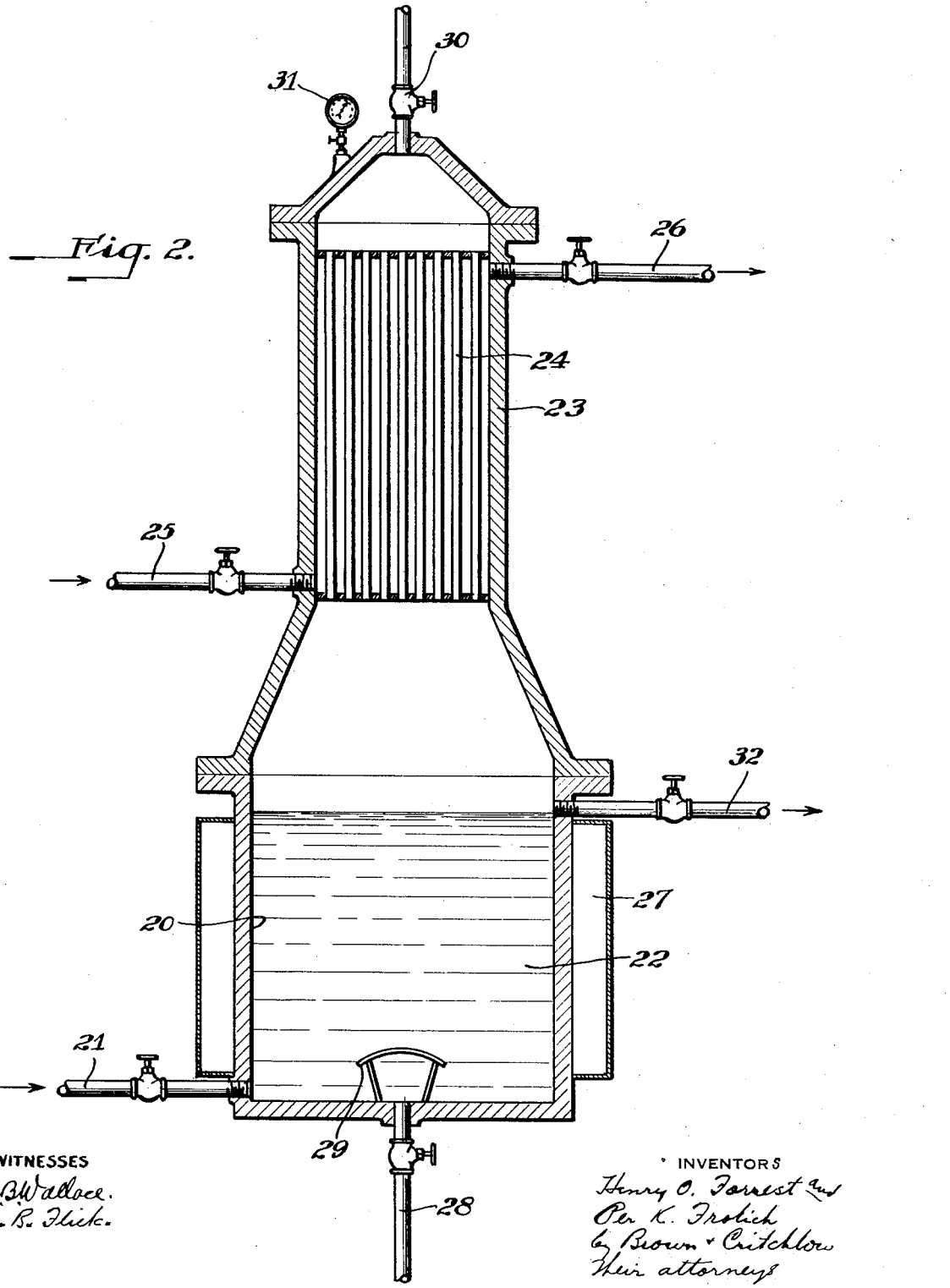

1,936,427

UNITED STATES PATENT OFFICE 1,936,427

PROCESS OF OXIDIZING NAPHTHALENE AND RELATED CONDENSED AROMATIC RING COMPOUNDS

Henry O. Forrest, Andover, Mass., and Per K. Frolich, Elizabeth, N. J., assignors to National Synthetic Corporation, Painesville, Ohio, a corporation of Delaware Application January 31, 1930. Serial No. 424,906

8 Claims. (Cl. 260—108)

This invention relates to direct oxidation processes, and especially to the partial oxidation of cyclic organic compounds.

The processes heretofore known and practiced for the commercial production of oxygenated aromatic or cyclic organic compounds are open to numerous objections. For example, in the prior liquid phase processes an active agent, such as an alkali, a catalyst, has been necessary, or an intermediate compound has been used, such as benzyl chloride in the production of benzoic acid from toluene, or else the necessary oxygen has been generated in a solution or suspension of the compound to be oxidized. Consequently it may be said that the prior liquid phase processes are of an indirect nature, and are subject to the limitations of such processes. Thus, the use of auxiliary active agents and the like may cause losses due to side reactions, and the use of a plurality of steps engenders decreased yields, and the oxygenated product may be contaminated. Furthermore, the active agents and formation of intermediates add to the cost.

Vapor phase processes are of a more direct nature than those just referred to, and because they are free from many of the disadvantages of indirect processes, many vapor phase processes have been proposed and used for the oxidation of aromatic compounds to produce more useful products. All oxidation processes, however, are exothermic, and consequently there is a tendency toward complete degeneration to carbon dioxide. To produce useful yields of a desired oxidation product this effect must be minimized by careful and accurate temperature control of both liquid and vapor phase processes. Such temperature control is particularly difficult in vapor phase processes, because of the inherent difficulty of regulating vapor temperatures, and because the processes under consideration are all catalytic.

Vapor phase processes require the treatment of large volumes of gases, and even under the best conditions of operation it has not been possible to maintain the entire body of gas in the reaction zone at a uniform temperature. That is, although the gases at a heat-exchanging surface may be at proper temperature, the temperature inwardly from the wall will be above optimum. Or, if the center of the reaction zone is maintained at optimum temperature, the temperature gradient is such that the gases at the wall are too cool. Consequently, the oxidation processes previously proposed for use with cyclic organic compounds have been inefficient, being attended by high carbon dioxide formation, or by low conversion efficiencies. Also, it is characteristic of prior processes that the ring is usually broken with production of less valuable products.

In consequence of these and other disadvantages of the prior processes there has been no completely satisfactory process available up to the present time for the commercial oxidation of cyclic organic compounds, all such processes being subject to the disadvantages referred to, and being also subject to the known difficulties and disadvantages which the use of catalysts and other active agents present.

It is an object of this invention to provide a process for the partial oxidation of cyclic organic compounds, which effects direct oxidation to the desired product, produces useful yields and minimizes side reactions and complete degeneration to carbon dioxide, uses an oxygen-containing gas, preferably air, as the oxidizing medium, is applicable generally to the oxidation of compounds of the type referred to, is simple, efficient and readily controlled, and satisfactorily overcomes many of the disadvantages of prior processes.

Among others it is a particular object to provide a process of the type referred to in which active agents are not required, which makes use of the liquid phase, provides ready and accurate temperature control, does not require elaborate or unduly expensive apparatus, and which produces a maximum of products retaining a ring structure.

The accompanying drawings show two types of apparatus which may be used in the practice of the invention, in which Fig. 1 is a schematic drawing showing apparatus adapted particularly for liquid phase operation; and Fig. 2 a vertical section through an apparatus adapted to two-phase liquid-vapor operation.

The invention is primarily predicated upon our discovery that cyclic organic compounds may be oxidized directly by molecular oxygen without the intervention of active agents, by contacting them with oxygen in a closed system at an elevated temperature and under a pressure substantially greater than the vapor pressure of the compound at the reaction temperature.

The invention is applicable to the oxidation of compounds of carbon having a closed ring structure, especially the aromatic and related compounds, and an important feature is that the oxidation may be controlled to prevent disruption of the ring, or to retain in the oxidized product at least one closed ring nucleus where the starting substance contains more than one ring. If benzene is treated in accordance with the invention, the ring is broken, apparently because the splitting of an oxygen molecule in effecting oxidation of one hydrogen of the benzene ring leaves the other oxygen atom in such a highly reactive state that it attacks another hydrogen atom, weakening the ring and causing its rupture. This untoward effect is apparently absent or greatly repressed where one or more nuclear hydrogen atoms are replaced by a side chain or other group which is more readily oxidized than the inert hydrogen atoms attached to the nucleus. Accordingly, the invention particularly contemplates the oxidation of (a) substituted benzene, or aromatic, compounds, and especially the oxidation of purely aliphatic side chains attached to the nucleus, examples of such compounds being toluene and the xylenes, (b) polynuclear or condensed ring compounds, for example naphthalene, and (c) nahpthenes or hydroaromatic compounds, for example cyclohexane. All such compounds are for brevity of reference herein comprehended by the term "cyclic organic compound".

Although the invention is especially applicable to the oxidation of hydrocarbons of the type referred to, it may be applied to other substances, such as substances initially containing oxygen, for example, cresols, aldehydes, and/or other cyclic organic compounds.

As previously stated, prior commercial processes have invariably employed a catalyst, an alkali, or oxygen-liberating or other auxiliary materials. All such substances are herein cojointly referred to as active agents, and under the invention as described none of them are essential.

In the practice of the invention the compound is treated with an oxygen-containing gas, and air will in most cases be wholly satisfactory. However, pure oxygen, ozone, and other oxygen-containing gases may be used.

In accordance with the invention, the total pressure in the system is maintained at least at the vapor pressure of the reacting compound at the temperature of the reaction, but preferably it is considerably in excess of that value, and most suitably it is substantially in excess of the critical pressure of the compound. The reaction is carried out at an elevated temperature in excess of the melting point of the compound being oxidized, and in the preferred practice it is above the normal boiling point of the compound but below that critical for the compound.

The temperature may be controlled in part by regulating the concentration of oxygen with respect to that of the material undergoing oxidation, for example by admitting oxygen at such a rate with respect to the oxidizable substance that the heat evolved will not cause an excessive temperature, or by dilution with an inert gas. However, in the course of our researches we have found that the temperature of highly exothermic gas-liquid reactions may be controlled readily to provide uniformity of temperature throughout the reaction zone by vaporizing and condensing in the system one or more components of its liquid phase, and that this means is especially applicable to direct oxidations of the type just referred to. In other words, the temperature of a gas-liquid reaction may be controlled directly by regulation of the total pressure on the system, as will be more fully explained hereinafter.

The invention may be practiced in various ways. For example, the material, liquefied if it is solid at normal temperatures, may be treated with an oxygen-containing gas, and when sufficient gas has been dissolved in the liquid material, the liquid-gas solution is passed under pressure into a reactor which has been preheated to a suitable temperature. The liquid is preferably saturated with oxygen to an amount sufficient to effect the desired oxidation.

This procedure may be practiced in connection with any suitable apparatus, for example that shown in Fig. 1. This apparatus comprises a saturator 1 having an inlet conduit 2 provided with a branch 3 connected to a source of oxygen-containing gas, such as an oxygen cylinder 4, and a branch 5 connected to a source of the compound to be oxidized, for example a cylinder 6 containing toluene. The toluene or other material may be forced into the saturator by means of an inert gas, for example nitrogen, supplied through a pipe 7.

The liquid-gas solution is passed under appropriate pressure through a conduit 8 into a pressure reactor 9 supported in a heating bath 10, and in order to increase the exposure conduit 8 preferably terminates in a coil 11, most suitably of capillary tubing, disposed in the reactor. The solution may be forced through the reactor by means of a liquid which is immiscible with it, such as ethylene glycol in the case of toluene, which is forced into the saturator from a container 12 through a pipe 13, as by a pump, or by means of nitrogen or other inert gas under pressure, or by any other suitable means. The heating bath, which may be molten lead-tin alloy, is maintained at a constant temperature in any suitable manner, as by an electrical heater, not shown.

The material forced through the reactor coil expands after leaving the reactor, and the products pass to a condensing system 14, where condensible substances are collected. The residual gases are passed from the condensers through a conduit 15 to a meter 16, and may be collected in a gasometer for further use. All of the lines are provided with suitable valves, as will be understood.

In the operation of this form of apparatus the compound or material to be oxidized is contacted with molecular oxygen at an elevated temperature and under high pressure, and the reaction probably takes place during passage of the compound through the reactor coil. No catalyst or other active agent is necessary, and our tests have shown that the reaction is apparently not affected by the material of which the coil is composed, several widely different metals having been used for this purpose, which indicates that the reaction is one of direct oxidation by the molecular oxygen present.

The end products may be worked up in any suitable manner, to separate and recover unreacted material and the oxidized product or products, such procedures being familiar chemical engineering unit processes. The exit gases may contain carbon monoxide and/or dioxide and other products, depending upon the type of gas initially used and the material being treated, and where air has been used, they are generally impoverished of oxygen and rich in nitrogen. Such tail gases may be worked up to recover desirable constituents, or they may be used as inert pressure media in the process, any unnecessary excess being discarded.

The temperature, pressure, gas concentration, length of exposure to reaction conditions, etc. will vary according to the material being treated, the product desired, and the concentration of oxygen in the gas and it is not possible to prescribe exact conditions for all materials. However, skilled workers may readily determine the conditions for any particular material, and they are further exemplified by the following data selected from tests which we have made.

If these runs toluene was oxidized in an apparatus similar to that just described, pure oxygen under pressure being passed into the saturator until the toluene had taken up an amount corresponding to that shown in the oxygen column of the following table. The toluene-oxygen solution was then forced into the reactor, the temperature in the reactor being maintained constant during the run. Calculations based on the time required for passage of the charge gave the period during which one molecule of toluene remained in the reactor, this being given in the "time" column.

| Compound | Oxygen mol % | Pressure # sq. in. | Temp. °C. | Time mins. | Oxygen converted to | | |
|---|---|---|---|---|---|---|---|
| | | | | | Benzoic acid | Benzaldehyde | $CO_2$ |
| Toluene | 4.1 | 1000 | 270 | 30 | 25.6 | 10.5 | 13.1 |
| Toluene | 4.1 | 1000 | 305 | 30 | 24.8 | 9.9 | 5.4 |
| Toluene | 4.1 | 1000 | 300 | 2 | 26.0 | 8.1 | 14.0 |

It will be observed that in this series of tests the total useful products are about the same at 270° C. as at 305° C., but that the carbon dioxide formation is substantially less at the higher temperature. Furthermore, at a given temperature, no advantage is gained by long exposure to reaction conditions, the reaction apparently being very rapid, as shown above as well as by other experiments which we have made, in which substantially the same yields were obtained with exposures of about 45 seconds. In these tests there was little, if any, carbon formation.

Adequate temperature control in the use of the apparatus just described is effected by conduction of heat through the wall of the reaction tube. That is, the ratio of heat dissipating surface of the capillary coil to the mass of reacting liquid within it is high. Also, the concentration of oxygen with respect to the reacting liquid is low, and this combination of factors renders temperature control relatively easy in such an apparatus.

The invention may also be practiced in other ways and in other apparatus than those just described. For example, the oxidizing gas may be passed into a large charge of the compound at reaction temperature in a two-phase liquid-vapor system. In such operation, large amounts of material may react during any given interval, causing liberation of large amounts of heat, and accurate and uniform temperature control throughout the entire reaction zone is essential. In prior practice of this nature such exact control has not been accomplished, because of the difficulty of attaining complete uniformity of temperature throughout the reaction mass even with the most modern heat exchanging systems. Our invention overcomes these difficulties and affords highly uniform temperature control throughout the reaction zone.

As previously stated, the rate of reaction, and consequently the amount of heat liberated in unit time, may be regulated, to some extent at least, by varying the concentration of oxygen with respect to the compound undergoing oxidation, and one means of accomplishing this is by dilution of the oxygen-containing gas with an inert gas, for example by recirculation of oxygen-impoverished effluent gases.

A major feature of our invention, however, resides in our discovery that almost perfect temperature control of exothermic gas-liquid reactions may be effected by absorbing heat of reaction by evaporation of one or more components of the liquid reaction charge and in heating the unreacted gases.

In this embodiment, a charge of the material to be oxidized is placed in a closed reactor provided with refluxing means and with means for heating the charge, and a suitable oxygen-containing gas is passed into the liquid charge. Due to the heat of reaction, the temperature of the material rises, and heat must be removed in order to maintain the reaction temperature. In accordance with this embodiment, use is made of latent heats of evaporation of the reaction materials and the heat capacity of the gases concerned for that purpose.

At any given temperature the liquid exerts a definite vapor pressure, and vaporization takes place, the amount of heat thus absorbed being dependent upon the amount of vaporization taking place. Because vaporization takes place into the inert or unconsumed fraction of the oxidizing gas, the amount of vaporization is in part controlled by the ratio of vapor pressure to total pressure. This ratio is determined by the temperature and total pressure due to the vapor pressure of the reacting material and the pressures exerted by the unconsumed fraction of the oxidizing gas, oxides of carbon, and other products of reaction. Therefore, by operating at a suitable pressure the ratio of vapor to inert gas is regulated and the temperature of these liquid-gas reactions may be effectively and accurately controlled. From what has been said, it will be seen that this operating pressure is determined by the amount of heat to be removed by vaporization per mol of inert gas.

The relation of the factors in this process may be shown by and understood from the following considerations. Considering first the simplest case, it is essential to have (1) an adiabatic system, (2) all oxygen reacting, (3) no gaseous or volatile products formed, (4) materials preheated to reaction temperature, and (5) equilibrium between liquid and vapor. If Q equals the heat evolved per mol of oxygen reacting, $n$ the number of mols of material vaporized in absorbing this heat, and V the molal heat of evaporation of the material at reaction temperature, then $Q = nV$, and $$n = \frac{Q}{V} \quad \text{Eq. I.}$$

If L represents the vapor pressure of the material, P the total pressure in the system, and $r$ the ratio of mols of inert gas to mols of oxygen, then $$\frac{L}{P} = \frac{n}{n+r} \quad \text{Eq. II.}$$

and by substitution in this equation of the value of $n$ from Equation I, $$P = L\frac{Q + rV}{Q} \quad \text{Eq. III.}$$

With air as the oxidizing gas, this equation becomes $$P = L\frac{Q + 3.76V}{Q} \quad \text{Eq. IV.}$$

These equations show that by maintaining a definite pressure on the system a definite amount of heat is removed by evaporation of the reaction material, and the liquid will be maintained at a uniform temperature. The application of the equations may be shown in connection with the oxidation of toluene at 270° C., for example. At this temperature the vapor pressure of toluene is approximately 400 pounds per square inch, and for purposes of calculation, V may be taken as 6000 calories per mol of toluene, and Q as 100,000 calories per mol of oxygen. Then $$P = 400 \frac{100000 + (3.76 \times 6000)}{100000} = 490 \text{ pounds.}$$

If the materials are pumped to the reactor cold, and assuming about 30 per cent of the heat to be used in preheating, $$P = 400 \frac{0.2 \times 100000 + (3.76 \times 6000)}{0.2 \times 100000} = 850 \text{ pounds.}$$

In case the gas contains only 10 per cent of oxygen, 85 per cent of the heat being consumed in preheating, the pressure would be $$P = 400 \frac{(0.15 \times 100000) + 9 \times 6000}{0.15 \times 100000} = 1840 \text{ pounds.}$$

Where air is used, $r$ is fixed, and the pressure is determined by the heat to be removed. Where heat losses from the system are high, the pressure must be high, or too much liquid will be evaporated and the system will operate at too low a temperature. Where heat losses are low, the pressure will still be above the vapor pressure of the reacting liquid. If the pressure is maintained at that required for desired reaction temperature, the heat will be removed as rapidly as it is evolved, but if the pressure is too high, an insufficient amount of vapor will be removed per unit volume of oxygen and the temperature will rise until equilibrium is effected by vaporization. On the other hand, if the pressure maintained in the system is too low, an excessive amount of liquid will be evaporated, and the temperature of the material will be below that desired.

Except for the assumption that no volatile products are formed, the factors on which the development of the foregoing equations is based are justified, because they can be substantially realized. Gaseous products will generally be formed, however, and in this case, assuming $x$ = mols of volatile products per mol of oxygen, $S$ = mols of material supplied to the system, $Tr$ = reaction temperature, $Tg$ and $Tl$ = entering temperature of gas and material respectively, $Cpg$ and $Cpl$ = average molal heat capacity of gas and material, then $$Q = nV + (1+r)(Tr - Tg)(Cpg) + S(Tr - Tl)Cpl,$$

and $$n = \frac{Q - (1+r)(Tr - Tg)(Cpg) - S(Tr - Tl)Cpl}{V}$$

and $$\frac{L}{P} = \frac{n}{n+r+x} \qquad P = L\frac{(n+r+x)}{n}$$

and solving $$P = L \cdot \frac{[Q - (1+r)(Tr - Tg)Cpg] - S(Tr - Tl)Cpl + rV + XV}{Q - (1+r)(Tr - Tg)Cpg - S(Tr - Tl)Cpl}$$

from which the operating pressure for a given set of conditions may be calculated.

This modified procedure may be performed in various ways, one of which may be understood in connection with Fig. 2. The reactor shown comprises a lower reaction chamber 20 provided with an inlet connection 21 for introducing a charge 22 of material to be oxidized, and an upper reflux portion 23 having means for condensing vapors arising from the reaction zone. The condenser consists of an ordinary tube basket 24 around the tubes of which cooling water may be circulated, as by means of inlet and discharge conduits 25 and 26. Chamber 20 is provided with means for heating the charge, such as an electric heater 27, and oxygen-containing gas is passed into the charge through an inlet pipe 28, means such as a spreader dome 29 being preferably provided to distribute the gas throughout the charge. The apparatus is also provided with a pressure-controlling valve 30 of any suitable type, preferably one which is adjustable to automatically relieve the pressure at a predetermined value. A pressure gauge 31 is also provided.

In the use of this apparatus it will usually be desirable to discontinue heating after the reaction has started, because the reaction may be regulated so as to continue it by the heat of oxidation, although the equations given show that heat input would permit the pressure to be decreased to the vapor pressure of the compound. However, for reasons of economy, such heat input is undesirable, and the minimum pressure will generally be considerably above the vapor pressure at the reaction temperature, the useful pressures in most cases lying between about 750 and 2500 pounds per square inch.

The process may be performed in batch or continuous fashion. In batch operation the reaction products may be withdrawn from connection 21. In the case of continuous operation fresh compound may be continuously introduced through inlet 21, and partially oxidized liquid withdrawn in equal amount from the reaction chamber, for example through an outlet pipe 32. The reacted material thus withdrawn may be worked up for separation of its products from unreacted material, or it may be returned directly to the system.

While the oxygen-containing gas may be introduced intermittently, to maintain the proper oxygen-concentration in the reactor, it is most desirable to introduce this gas continuously, and preferably at substantially the rate at which it is consumed.

Tests which we have made of the modified procedure described above also demonstrate the benefits to be derived from the invention. In these tests, an apparatus embodying the constructional features shown in Fig. 2 was used, and air was used as the oxygen-containing gas. In one run, toluene was charged into the reactor and heated to 280° C., this temperature being maintained in the manner described by maintaining the total pressure at 1000 pounds per square inch. The reaction liquid was cycled continuously, and air was passed into the liquid in the reactor at a rate such that the inlet oxygen corresponded to 9.1 mol per cent. Upon analysis of the reaction mixture, it was found that the benzoic acid and benzaldehyde concentrations were 3.3 and 1.0 per cent respectively, corresponding to oxygen conversions of 25.6 per cent and 3.5 per cent respectively. The conversion of oxygen to carbon dioxide was 11.6 per cent.

In a similar run at 280° C., with inlet oxygen corresponding to 23.7 mol per cent, and the other conditions being essentially the same, the benzoic acid and benzaldehyde concentrations were 10.0 and 1.1 per cent respectively, corresponding to oxygen conversions of 24.2 and 1.6 per cent respectively. Still higher concentrations of benzoic acid in the liquid have been obtained by further increasing the ratio of inlet oxygen. Our experiments along this line have shown that under the conditions of these tests the benzaldehyde concentration remains in the neighborhood of about 1 per cent, irrespective of any increase in benzoic acid concentration, and accordingly the ratio of acid to aldehyde formation may be controlled. Tests made at temperatures as low as 220° C., using an air input of 700 liters per hour, corresponding to 31.2 mol per cent of oxygen, have given benzoic acid and benzaldehyde concentrations of 15.1 and 1.9 per cent respectively, corresponding to oxygen conversions of 26.6 and 1.7 per cent respectively.

Experiments with other types of cyclic compounds have demonstrated the wide applicability of the processes according to the invention to organic compounds of the type stated. For example, naphthalene may be oxidized to produce phthalic anhydride, and oxygenated compounds may be made from a variety of other cyclic compounds, such as cyclohexane and xylene. Our tests with commercial xylene have indicated that toluic aldehydes, acids and anhydrides may be produced. In our investigations with compounds other than toluene, the procedure was essentially similar to that described hereinabove.

In most cases, the compound being treated will vaporize sufficiently to adequately provide the desired temperature control. In some cases, however, the material may have such a low vapor pressure that adequate control is not provided, or this result may arise where the material is depleted by reaction and the products do not possess sufficiently high vapor pressures. Our invention also provides for such cases. In this event, a material may be added to the liquid to act as a heat-exchanging component. Such a material should possess a high vapor pressure at, and its critical temperature should be above, the temperature of reaction, and it should be inert under the conditions of reaction. Likewise, it should be inert, and miscible with the material to be oxidized. For most purposes water is an ideal heat exchanging medium for such use, because it possesses a critical temperature in excess of that generally necessary, its vapor pressure is high at elevated temperatures, and it has a high latent heat. In most cases some water will be formed in these reactions, but because its concentration is normally low, its effect will usually be of minor consequence, and water may be added to the charge, or, in continuous processes, the water may be allowed to accumulate to the necessary amount.

Materials of the type referred to are added solely for their heat-exchanging properties, and they do not enter into the reaction, and consequently are not active agents as that term is used herein. They may also be used as a means of intimately contacting oxygen with the compound to be oxidized. Thus a solution of oxygen in carbon tetrachloride may be mixed with the compound either in the saturator or the two-phase procedure. In both cases it provides an intimate commingling of the reactants, and in the saturator procedure an inert material is added which modifies the intensity of the reaction by acting as a diluent, while in the procedure last described, the same result is achieved by the heat-exchanging effect.

So far as we are now aware, it is characteristic of our invention that the major portion of the oxidized products retain their aromatic character, and where both aldehydic and acidic products are formed, the acidic compounds usually predominate. The ring is not broken in the oxidation, or, as in the case of polynuclear compounds, at least one ring nucleus remains where the original compound was composed of several rings. This is an important benefit of the invention, because it contributes to the production of attractive yields of useful cyclic compounds which have hitherto been made by indirect or expensive processes, or by processes which possessed various disadvantages.

The process according to the invention is simple, direct, productive of good yields at low cost, and renders unnecessary the use of active agents with their attendant cost, and difficulty of separation and recovery. A particularly important benefit is consequent upon direct oxidation combined with accurate temperature control. Not only does the invention provide ready and accurate temperature control, but, what is of at least equal importance, it insures in large masses of reacting liquids an almost perfect uniformity of temperature with substantially no temperature gradient or tendency to overheating at any point.

Claims generic to the process of oxidizing cyclic organic compounds disclosed herein together with claims to the oxidation of substituted benzene compounds, are contained in a copending application, Serial No. 424,904, filed concurrently herewith. Another copending application, Serial No. 424,905, claims the process of oxidizing naphthenes, and the process of controlling the temperature of reacting liquids which is disclosed herein, is broadly disclosed and claimed in still another concurrently filed copending application, Serial No. 424,907. All of the foregoing applications were filed on January 31, 1930.

According to the provisions of the patent statutes, we have explained the principle and mode of operation of our invention, and have illustrated and described what we now consider to be its best embodiment. However, we desire to have it understood that, within the scope of the appended claims, the invention may be practiced otherwise than as specifically illustrated and described.

We claim:

1. A process of partially oxidizing a compound of the group consisting of naphthalene and related condensed aromatic ring compounds in which two rings share two adjacent carbon atoms, comprising contacting a liquid body of said compound with a gas containing free oxygen in a closed system while heated to an elevated temperature below the critical temperature of the compound and under a pressure substantially greater than the vapor pressure of the compound at said temperature, and thereby directly oxidizing said compound and forming a partial oxidation product thereof.

2. A process of partially oxidizing a compound of the group consisting of naphthalene and related condensed aromatic ring compounds in which two rings share two adjacent carbon atoms, comprising contacting a liquid body of said compound with a gas containing free oxygen in a closed system, the compound being heated to a temperature intermediate its normal boiling and critical temperatures, and said gas being under a pressure substantially in excess of the vapor pressure of the compound at said temperature, and thereby directing oxidizing said compound and forming a partial oxidation product thereof.

3. A process of partially oxidizing a compound of the group consisting of naphthalene and related condensed aromatic ring compounds in which two rings share two adjacent carbon atoms, comprising contacting a liquid body of said compound with a gas containing free oxygen in a closed system, the compound being heated to a temperature intermediate the normal boiling and critical temperatures, and said gas being under a pressure substantially in excess of the critical pressure of the compound, and thereby directly oxidizing said compound and forming a partial oxidation product thereof.

4. A process of partially oxidizing a compound of the group consisting of naphthalene and related condensed aromatic ring compounds in which two rings share two adjacent carbon atoms, comprising contacting a liquid body of said compound with a gas containing free oxygen in a closed system, said compound being heated to a temperature intermediate its normal boiling and critical temperatures in a closed system and under a total pressure in excess of the vapor pressure of the compound at said temperature, and while maintaining the liquid body at said temperature and pressure supplying said gas at a rate to substantially maintain the oxygen concentration.

5. A process of partially oxidizing a compound of the group consisting of naphthalene and related condensed aromatic ring compounds in which two rings share two adjacent carbon atoms, comprising passing a gas containing free oxygen into a heated liquid body of said compound in a closed system, supplying said gas to replace the oxygen consumed, maintaining a total pressure in the system substantially in excess of the vapor pressure of the compound at reaction temperature to cause said liquid to vaporize and maintain the entire body uniformly at said temperature, said temperature lying between the normal boiling and critical temperatures of the compound, and condensing and returning the vaporized liquid to the system.

6. A process of partially oxidizing a compound of the group consisting of naphthalene and related condensed aromatic ring compounds in which two rings share two adjacent carbon atoms, comprising passing a gas containing free oxygen into a heated liquid body of said compound in a closed system, supplying said gas to replace the oxygen consumed, maintaining a total pressure in the system substantially in excess of the critical pressure of the compound at reaction temperature to cause said liquid to vaporize and maintain the entire body uniformly at said temperature, said temperature lying between the normal boiling and critical temperatures of the compound, and condensing and returning the vaporized liquid to the system.

7. A process of directly oxidizing naphthalene, comprising passing a gas containing free oxygen into a liquid body of naphthalene heated to a temperature intermediate its normal boiling and critical temperatures in a closed system, supplying said gas to replace the oxygen consumed, maintaining a total pressure in the system in excess of the vapor pressure of naphthalene at said temperature, and by vaporization of naphthalene in the system absorbing heat of reaction to maintain the entire liquid body uniformly at said temperature, said temperature of the liquid being determined by regulation of the total pressure in the system, and condensing and returning the vaporized naphthalene.

8. A process of directly oxidizing naphthalene comprising contacting liquid naphthalene with molecular oxygen in a closed system at a temperature intermediate the normal boiling and critical temperatures of naphthalene and under a pressure substantially in excess of the vapor pressure of naphthalene at said temperature.

HENRY O. FORREST.
PER K. FROLICH.